United States Patent
Price et al.

(10) Patent No.: US 8,710,698 B2
(45) Date of Patent: Apr. 29, 2014

(54) REDUNDANT POWER DELIVERY

(75) Inventors: Gerald A. Price, Raleigh, NC (US);
Margaret M. Quinn, Raleigh, NC (US);
Edward S. Suffern, Raleigh, NC (US);
J. Mark Weber, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 12/762,568

(22) Filed: Apr. 19, 2010

(65) Prior Publication Data
US 2011/0254367 A1  Oct. 20, 2011

(51) Int. Cl.
*H02J 7/00* (2006.01)
*H02J 9/00* (2006.01)

(52) U.S. Cl.
USPC ............ 307/64; 307/11; 307/80; 307/126; 307/147

(58) Field of Classification Search
USPC ............................................ 307/64
See application file for complete search history.

(56) References Cited

U.S. PATENT DOCUMENTS

| | | | |
|---|---|---|---|
| 5,439,390 A | 8/1995 | Raynor et al. | |
| 5,902,148 A | 5/1999 | O'Rourke | |
| D438,510 S | 3/2001 | Leen | |
| 6,805,579 B2 | 10/2004 | Marchand et al. | |
| 2004/0000815 A1* | 1/2004 | Pereira | 307/11 |
| 2009/0295233 A1 | 12/2009 | McGinley et al. | |
| 2010/0090851 A1* | 4/2010 | Hauser | 340/657 |
| 2010/0141040 A1* | 6/2010 | Chapel et al. | 307/80 |

FOREIGN PATENT DOCUMENTS

AU    2002100567 A4    9/2002

* cited by examiner

*Primary Examiner* — Rexford Barnie
*Assistant Examiner* — Toan Vu
(74) *Attorney, Agent, or Firm* — Brandon C. Kennedy; Katherine S. Brown; Biggers Kennedy Lenart Spraggins LLP

(57) ABSTRACT

Redundant power delivery including a power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground; a selectable redundant power module, the selectable redundant power module comprising a plurality of input connectors, each input connector comprising a hot, neutral, and ground contacts and adapted to engage each second plug of each power line; and a switch to select one or more of the input connectors of the selectable redundant power module for receiving power.

19 Claims, 5 Drawing Sheets

REDUNDANT POWER DELIVERY

BACKGROUND OF THE INVENTION

1. Field of the Invention

The field of the invention is methods, apparatus, and systems for redundant power delivery.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Today rack-mounted servers and other computers and devices have a single power supply. These power supplies are connected often one-to-one to a power distribution unit ("PDU") in a rack environment. This configuration is not economical since one PDU and one power cord are used for each server. This configuration is also not redundant and cannot be made redundant.

SUMMARY OF THE INVENTION

Redundant power delivery including a power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground; a selectable redundant power module, the selectable redundant power module comprising a plurality of input connectors, each input connector comprising a hot, neutral, and ground contacts and adapted to engage each second plug of each power line; and a switch to select one or more of the input connectors of the selectable redundant power module for receiving power.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
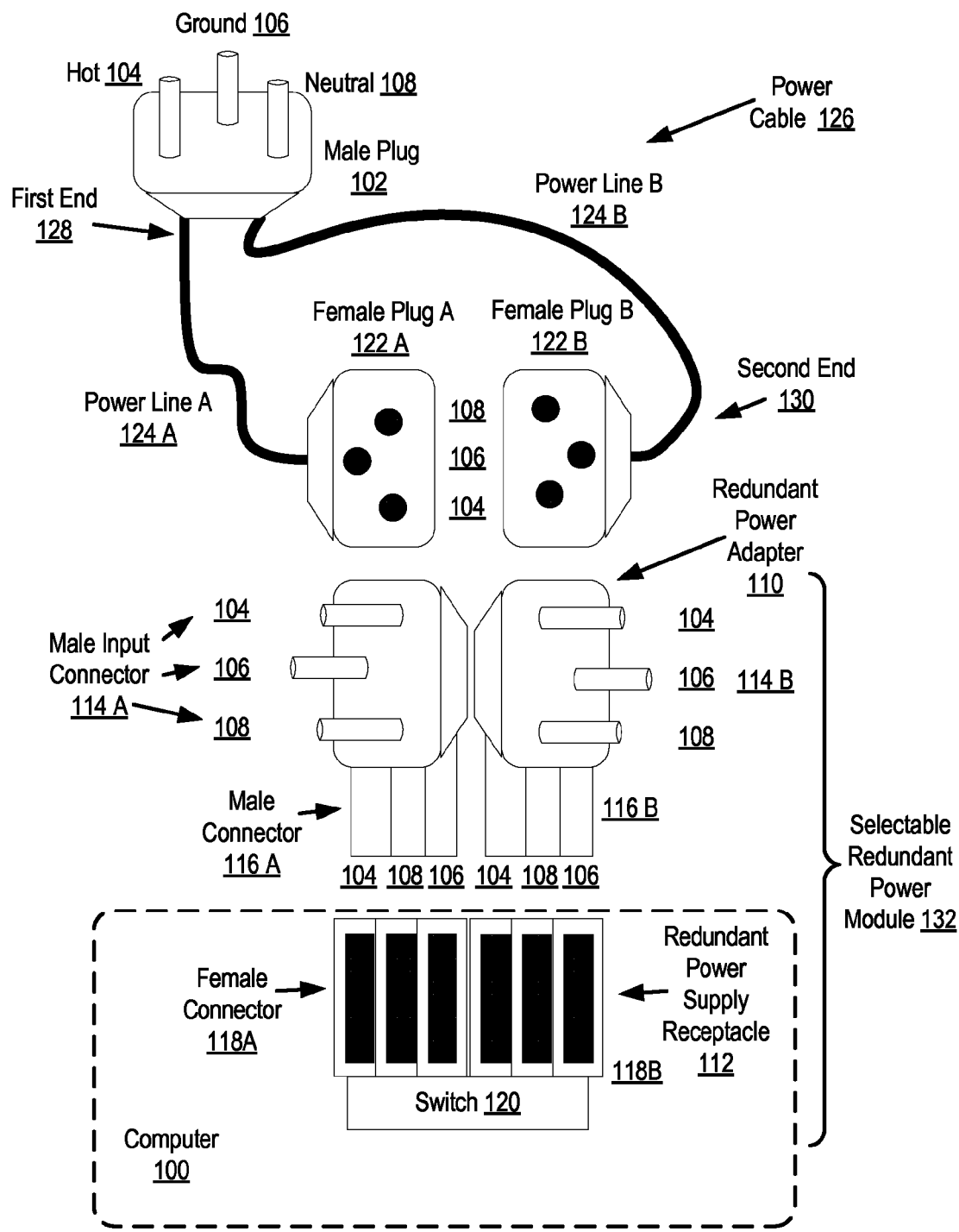
FIG. 1 sets forth a line drawing of a system for redundant power delivery according to embodiments of the present invention.

A system, apparatus, and method for redundant power delivery in accordance with the present invention are described with reference to the accompanying drawings, beginning with FIG. 1. FIG. 1 sets forth a line drawing of a system for redundant power delivery according to embodiments of the present invention. The system of FIG. 1 includes a power cable (126). The power cable (126) of FIG. 1 includes a first plug (102) including contacts for hot (104), neutral (108), and ground (106). The hot contact (104) provides electric potential to electrical ground or neutral. The neutral contact (108) typically provides contact to a return leg of the power circuit.

The ground contact (106) typically provides a conductor with continuity to earth. The plug (102) of FIG. 1 is illustrated as a male plug. In alternate embodiments, the plug may be a female plug or a plug of an alternative form factor as will occur to those of skill in the art.

The power cable (126) of FIG. 1 includes a plurality of power lines (124A and 124B). Each of the plurality of power lines of FIG. 1 (124A and 124B) is electrically connected independently to the hot (104), neutral (108), and ground (106) contacts of the first plug (102) at a first end (128). That is, each of the power lines (124A and 124B) is independently wired to the hot (104), neutral (108), and ground (106) contacts of the first plug (102) at a first end (128) such that failure of the wiring to the contacts of, for example, Power Line A (124) will not affect the ability of Power Line B (124) to receive power in its usual fashion.

Figure 2:
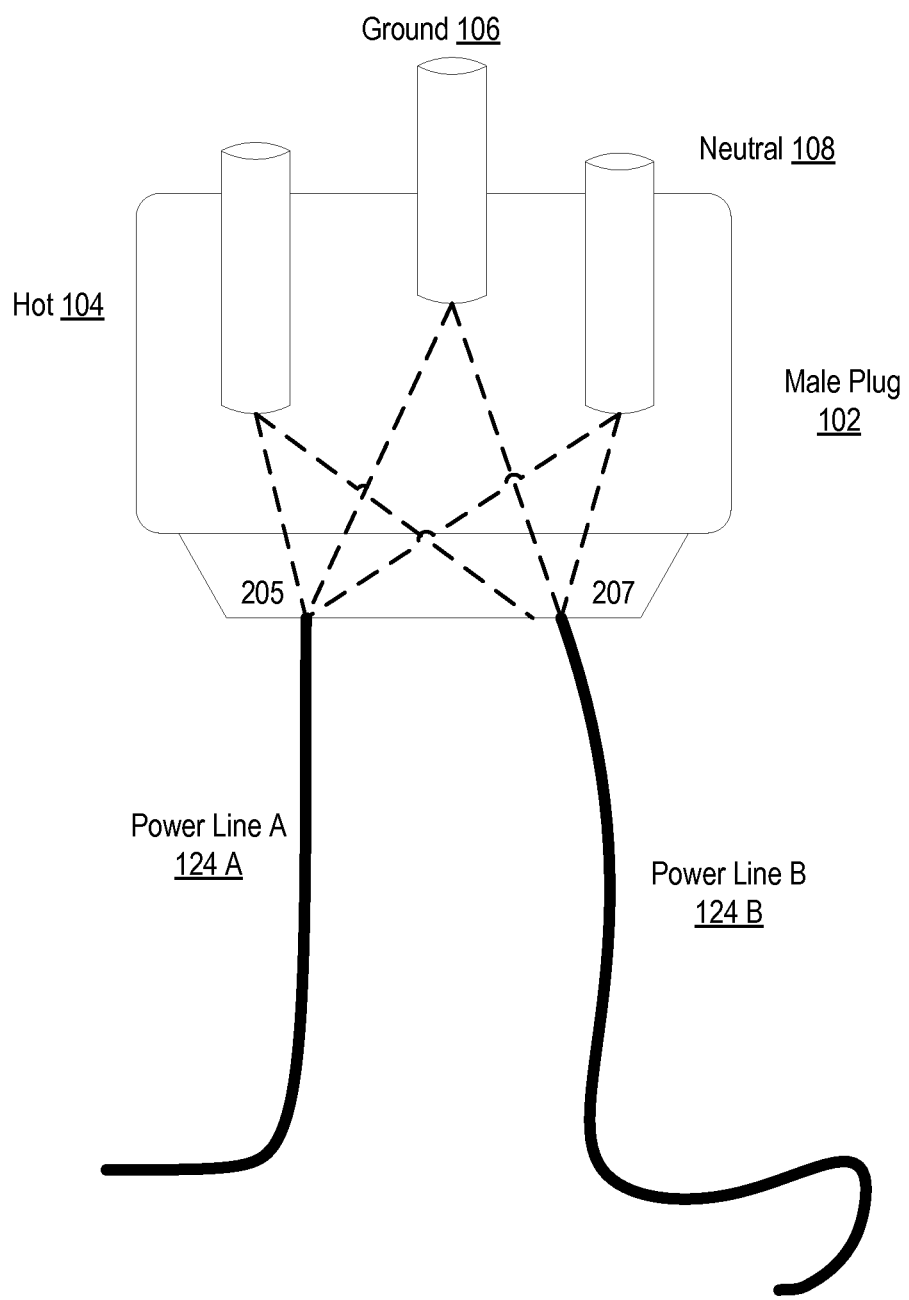
FIG. 2 illustrates a line drawing of power lines is electrically connected independently to the hot, neutral, and ground contacts of a plug.

For further explanation, FIG. 2 illustrates a line drawing of power lines is electrically connected independently to the hot, neutral, and ground contacts of a plug. In the example of FIG. 2, two power lines (124A and 124B) are electrically connected independently (205 and 207) to the hot (104), neutral (108), and ground (106) contacts of the plug (102). That is, power line A (124A) is independently wired (205) to the hot (104), neutral (108), and ground (106) contacts of the first plug (102). Similarly, power line B (124B) is independently wired (207) to the hot (104), neutral (108), and ground (106) contacts of the plug (102).

In the examples of FIGS. 1 and 2, only two power lines are illustrated as independently electrically connected to the first plug. This is for explanation and not for limitation. In fact, any number of power lines may be independently electrically connected to the contacts of a single plug as will occur to those of skill in the art and all such embodiments are within the scope of the present invention.

Again with reference to Figure: Each power line (124A and 124B) of the power cable (126) of FIG. 1 has a second plug (122A and 122B) at a second end (130) providing contacts for hot (104), neutral (108), and ground (106). In the example of FIG. 1, the plugs (122A and 122B) at the second end (130) of the power cable (126) are female plugs. In alternate embodiments, the plugs may be a male plugs or plugs of an alternative form factor as will occur to those of skill in the art.

The redundant power delivery system of FIG. 1 also includes a redundant power adapter (110). The redundant power adapter (110) of FIG. 1 includes a plurality of input connectors (114A and 114B) for receiving power from the power cable (126). Each of the input connectors (114A and 114B) of the redundant power adapter (110) of FIG. 1 includes a hot (104), neutral (108), and ground (106) contact and each of the input connectors (114A and 114B) adapted to engage each of the second plugs (122A and 122B) of each power line (124A and 124B) of the power cable (126). In the example of FIG. 1, the input connectors (114A and 114B) of the redundant power adapter (110) are male input connectors. In alternate embodiments, the connectors may be a female or of an alternative form factor for engagement with the plugs of the power cable (126) as will occur to those of skill in the art.

The redundant power adapter (110) of FIG. 1 also includes a plurality of output connectors (116A and 116B) providing power out to a redundant power supply receptacle (112). Each output connector (116A and 116B) of the redundant power adapter (110) of FIG. 1 provides a hot (104), neutral (108), and ground (106) contacts and is adapted to engage a plurality of input connectors (118A and 118B) of a redundant power supply receptacle (112). Each input connector (118A and 118B) of the redundant power supply receptacle (112) of FIG. 1 also has contacts for hot (104), neutral (108), and ground (106). The input connectors (118A and 118B) of the redundant power supply receptacle (112) of FIG. 1 are female input connectors. In alternate embodiments, the connectors may be a male or of an alternative form factor for engagement with the output connectors (116A and 116B) of the redundant power adapter (110).

The redundant power supply receptacle (112) of FIG. 1 also includes a switch (120) to select one or more of the input connectors of the redundant power supply for receiving power. In the example of FIG. 1, if the power lines, connectors, plugs, or other parts of the system delivering power to one of the input connectors (118A and 118B) of the redundant power supply receptacle (112) fails, the system of FIG. 1 may fail over by switching to receive power from the other input connector (118A and 118B). Switches according to embodiments of the present invention may be implemented in hardware, hardware and software, software or any other implementation of a switch that will occur to those of skill in the art.

In the example of FIG. 1, two paths of power delivery are illustrated through the power lines, plugs, connectors of the redundant power adapter and connector of the redundant power supply. This is for explanation, and not for limitation. In other embodiments, more than two power lines, plugs, connectors for redundant power adapters and connectors for redundant power supply receptacles may implement more than two paths of power delivery as will occur to those of skill in the art.

In the example of FIG. 1, the redundant power delivery system delivers power to a computer (100). This is for explanation and not for limitation. In fact, systems for redundant power delivery according to embodiments of the present invention may redundantly deliver power to any number of devices as will occur to those of skill in the art.

The arrangement of devices making up the exemplary system illustrated in FIG. 1 is for explanation, not for limitation. Data processing systems useful according to various embodiments of the present invention may include additional devices, power supplies, servers, routers, other devices, not shown in FIG. 1, as will occur to those of skill in the art. Various embodiments of the present invention may be implemented on a variety of hardware platforms in addition to those illustrated in FIG. 1.

In the example of FIG. 1, the redundant power adapter (110) and the redundant power receptacle (112) are implemented as separate entities. In alternative embodiments, their function may be implemented as a single selectable redundant power module (132). For further explanation, FIG. 4 sets forth a line drawing of a system for redundant power delivery with a single selectable redundant power module (132). The system of FIG. 4 is similar to the system of FIG. 1, in that the system of FIG. 4 includes a power cable (126) with a first plug (102) that includes contacts for hot (104), neutral (108), and ground (106) and a plurality of power lines (124A and 124B) and power line (124A and 124B) is electrically connected independently to the hot (104), neutral (108), and ground (106) contacts of the first plug (102) at a first end (128) and each power line (124A and 124B) has a second plug (122A and 122B) at a second end (130) providing contacts for hot (104), neutral (108), and ground (106).

Figure 3:
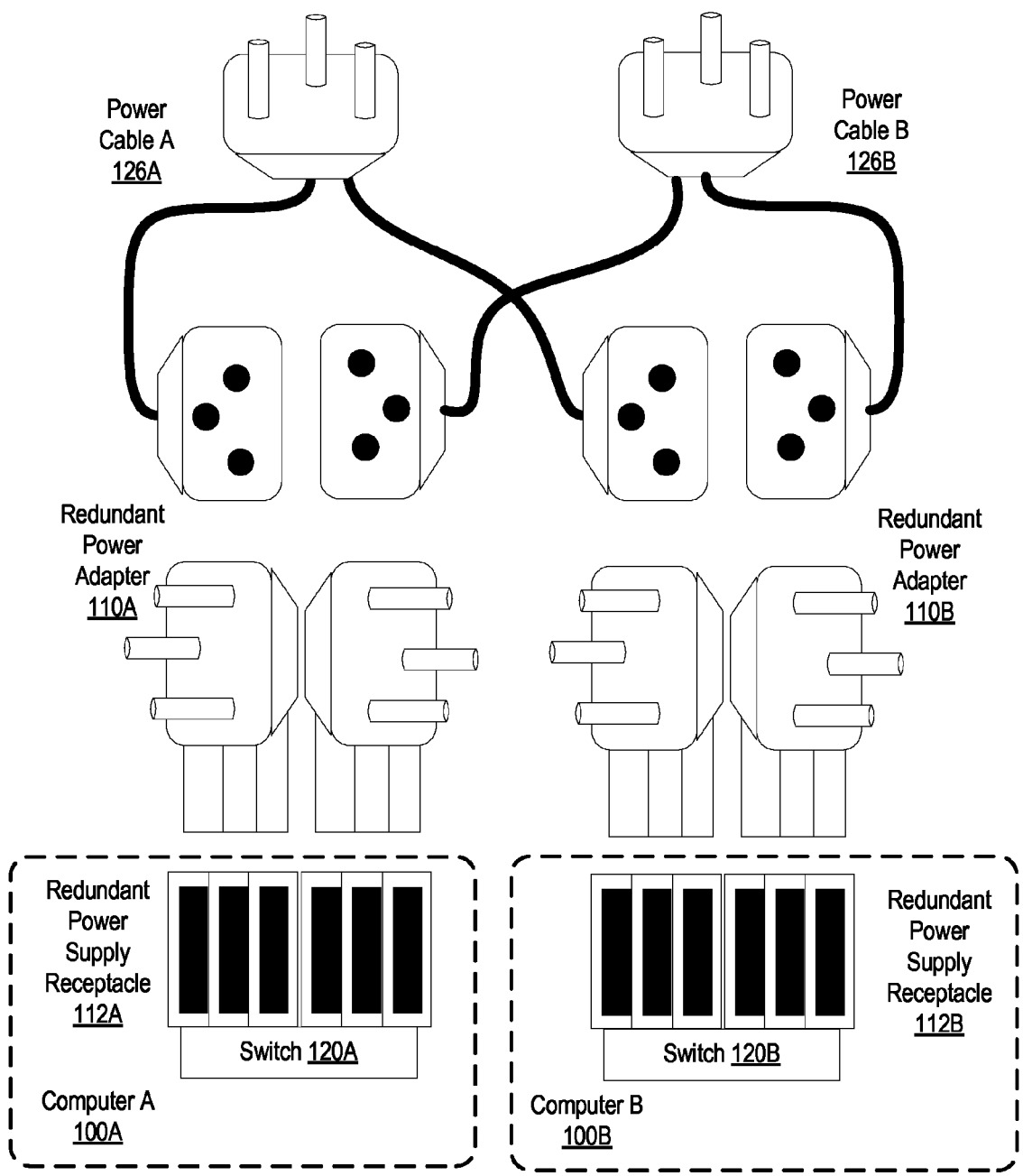
FIG. 3 illustrates a line drawing of a system for redundant power delivery that supports more than one power source and supports redundantly powering more than one device in accordance with embodiments of the present invention.

Those of skill in the art will recognize that while the system of FIG. 1 is redundant, it is still dependent upon a single source of power. For further explanation, FIG. 3 illustrates a line drawing of a system for redundant power delivery that supports more than one power source and supports redundantly powering more than one device. In the system of FIG. 3, at least one second plug of the power cable A (126A) is engaged with at least one input connector for redundant power adapter A (110A) for a first device with the redundant power supply receptacle (112A), computer A (100A). At least one second plug of the power cable B (126B) is also engaged with at least one input connector for redundant power adapter A (110A) for the first device with the redundant power supply receptacle (112A), computer A (100A). Similarly, at least one other second plug of the power cable A (126A) is engaged with at least one input connector for redundant power adapter B (110B) for a second device, with the redundant power supply receptacle (112B), computer B (100B). And at least one second plug of the power cable B (126B) is also engaged with at least one input connector for redundant power adapter B (110B) for the second device with the redundant power supply receptacle (112B), computer B (100B). The system of FIG. 3 extends the redundancy of redundant power delivery systems according to embodiments of the present invention.

Figure 4:
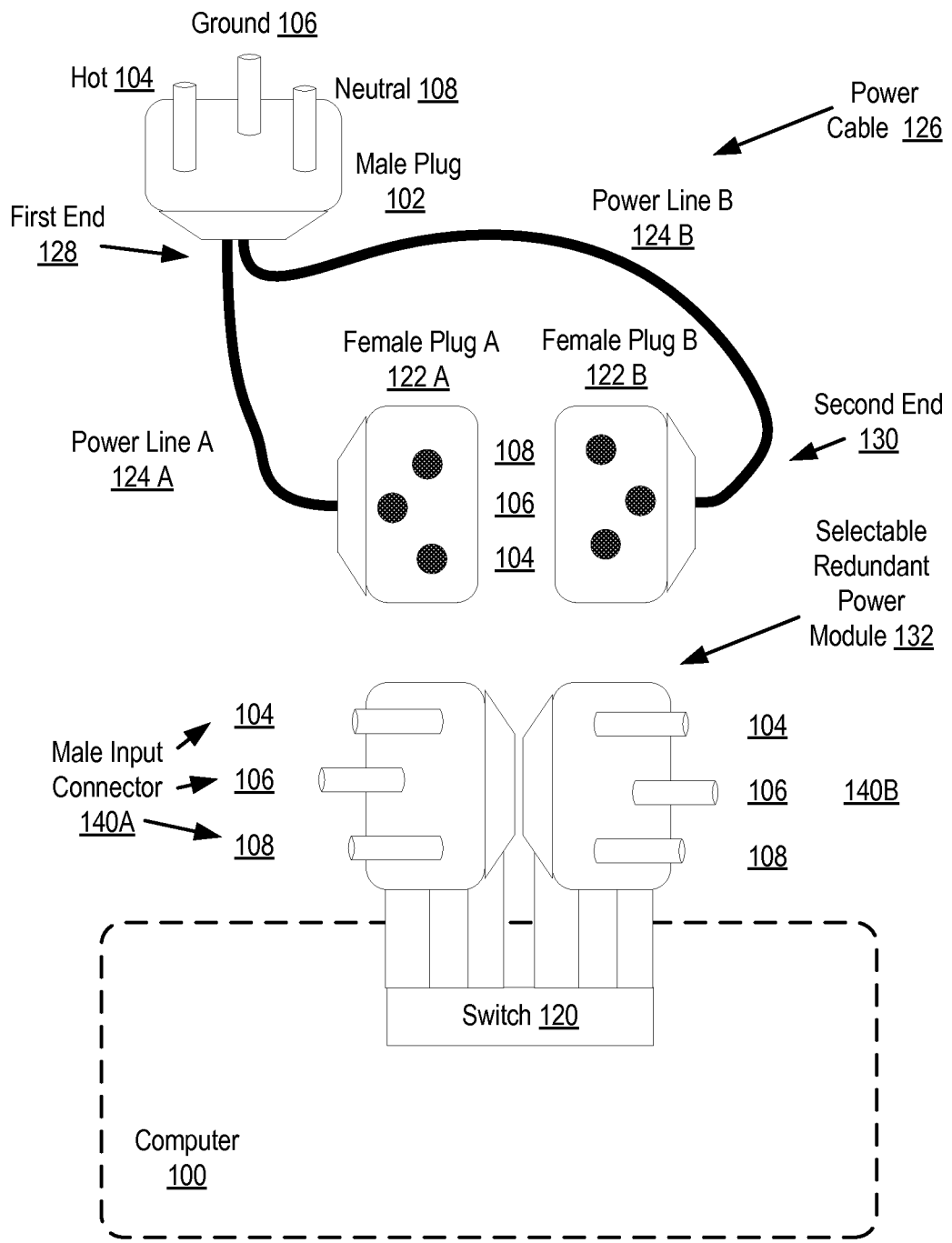
FIG. 4 sets forth a line drawing of a system for redundant power delivery with a single selectable redundant power module.

The system of FIG. 4 differs from the system of FIG. 1 in that the system of FIG. 4 includes a single selectable redundant power module (132). The selectable redundant power module (132) includes a plurality of input connectors (140A and 140B) to receive power from the power cable. Each input connector (140A and 140B) in the example of FIG. 2 includes a hot (104), neutral (108), and ground (106) contact and is adapted to engage each second plug (122A and 122B) of each power line (124A and 124B).

In the example of FIG. 4, the selectable redundant power module (132) includes a switch (120) to select one or more of the input connectors of the selectable redundant power module for receiving power. Switches according to embodiments of the present invention may be implemented in hardware logic, hardware and software, software or any other implementation of a switch that will occur to those of skill in the art.

In the example of FIG. 4, two paths of power delivery are illustrated through the power lines, plugs, and connectors of the selectable redundant power module. This is for explanation, and not for limitation. In other embodiments, more than two power lines, and connectors may implement more than two paths of power delivery as will occur to those of skill in the art.

In the example of FIG. 4, the plugs and connectors may be implemented in other form factors that those illustrated as will occur to those of skill in the art. All such form factors are within the scope of the present invention.

Those of skill in the art will recognize that the redundancy of the system of FIG. 4 may be extended in a manner similar to the example of FIG. 3 such that the second plug of the power cable is engaged with at least one input connector for a selectable redundant power module for a first device such as a computer and wherein at least one other second plug of the power cable is engaged with at least one input connector for a selectable redundant power module for a second device such as another computer.

Figure 5:
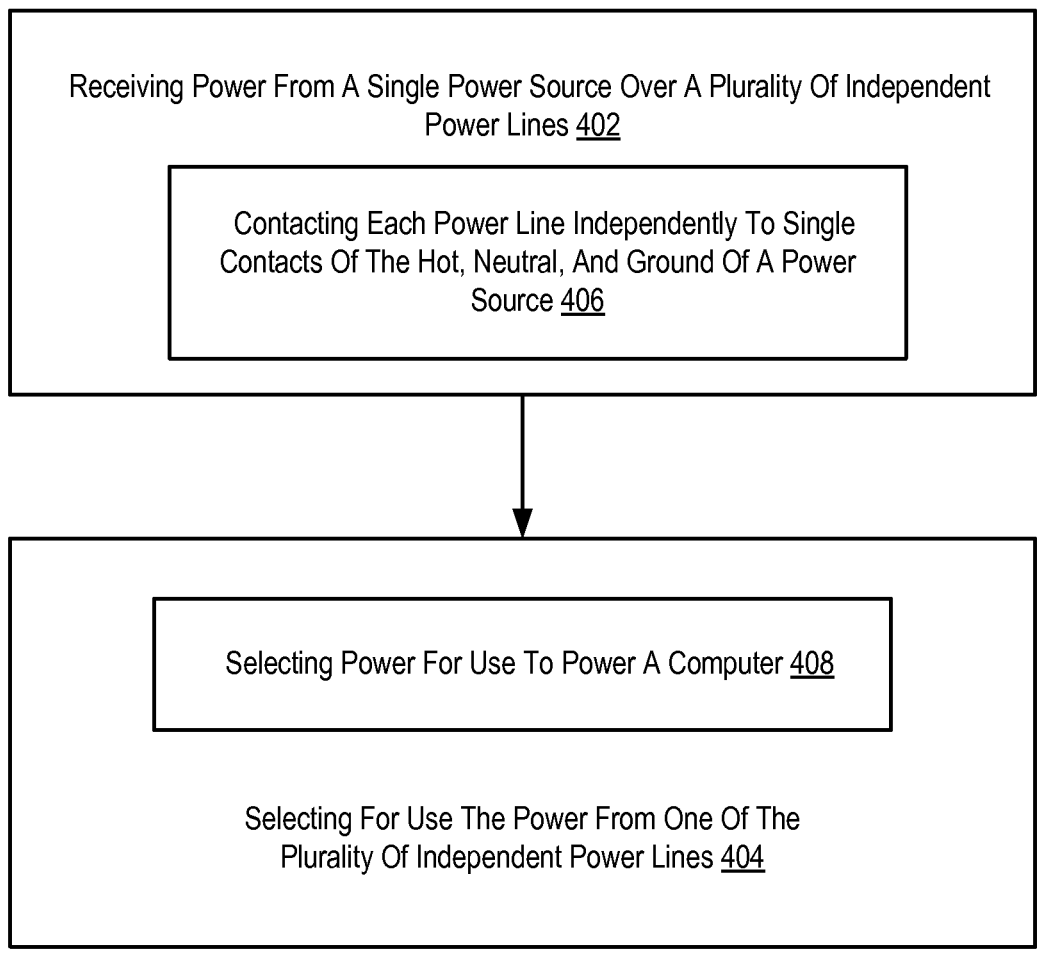
FIG. 5 sets forth a flow chart illustrating an exemplary method of redundant power delivery in accordance with the present invention.

For further explanation, FIG. 5 sets forth a flow chart illustrating an exemplary method of redundant power delivery in accordance with the present invention. The method of FIG. 5 includes receiving (402) power from a single power source over a plurality of independent power lines and selecting (404) for use the power from one of the plurality of independent power lines. In the method of FIG. 5, receiving (402) power from a single power source over a plurality of independent power lines includes contacting (406) each power line independently to single contacts of the hot, neutral, and ground of a power source. In the method of Figure, selecting (404) for use the power from one of the plurality of independent power lines includes selecting (408) power for use to power a computer.

Exemplary embodiments of the present invention are described largely in the context of a fully functional computer system for redundant power delivery. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for redundant power delivery, the method comprising:
   a power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground;
   a selectable redundant power module, the selectable redundant power module comprising a plurality of input connectors, each input connector comprising a hot, neutral, and ground contacts and adapted to engage each second plug of each power line, wherein at least one second plug of the power cable is engaged with at least one input connector for a selectable redundant power module for a first device and wherein at least one other second plug of the power cable is engaged with at least one input connector for a selectable redundant power module for a second device; and
   a switch to select one or more of the input connectors of the selectable redundant power module for receiving power.

2. The system of claim 1 wherein the first and second devices comprise computers.

3. The system of the claim 1 wherein the selectable redundant power module further comprises:
   a redundant power adapter comprising the plurality of input connectors, each input connector comprising a hot, neutral, and ground contact and adapted to engage each second plug of each power line,
   the redundant power adapter further comprising a plurality of output connectors, each output connector providing a hot, neutral, and ground contact and adapted to engage a plurality of input connectors of a redundant power supply receptacle, each input connector of the redundant power supply receptacle having contacts for hot, neutral, and ground;
   the redundant power supply receptacle further comprising the switch to select for receiving power and the switch further comprising a switch to select one or more of the input connectors of the redundant power supply for receiving power.

4. The method of claim 1 wherein the selectable redundant power module is integrated into a computer.

5. A redundant power delivery system, the method comprising:
   a power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground;
   a redundant power adapter comprising a plurality of input connectors, each input connector comprising a hot, neutral, and ground contact and adapted to engage each second plug of each power line,
   the redundant power adapter further comprising a plurality of output connectors, each output connector providing a hot, neutral, and ground contacts and adapted to engage a plurality of input connectors of one or more redundant power supply receptacles, each input connector of the redundant power supply receptacle having contacts for hot, neutral, and ground;
   the redundant power supply receptacle further comprising a switch to select one or more of the input connectors of the redundant power supply receptacle for receiving power.

6. The system of claim 5 wherein at least one second plug of the power cable is engaged with at least one input connector for a redundant power adapter for a first device and wherein at least one other second plug of the power cable is engaged with at least one input connector for a redundant power adapter for a second device.

7. The system of claim 6 wherein the first and second devices comprise computers.

8. The system of claim 5 wherein first plug of the power cable comprises a male connector.

9. The system of claim 5 wherein second plugs of the power cable comprises a female connector.

10. The system of claim 5 wherein the input connectors of the redundant power adapters are male connectors.

11. The system of claim 5 wherein the output connectors of the redundant power adapters are male connectors.

12. The system of claim 5 wherein the input connectors of the redundant power supply receptacle are female connectors.

13. The system of claim 5 wherein the redundant power supply receptacle is integrated into a computer.

14. A method of redundant power delivery, the method comprising:

receiving power from a single power source over a power cable, the power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground; each second plug of each power line is coupled to an input connector of a selectable redundant power adapter, each input connector of the selectable redundant power adapter comprising a hot, neutral, and ground contact and adapted to engage each second plug of each power line; the redundant power adapter further comprising a plurality of output connectors, each output connector providing a hot, neutral, and ground contacts and adapted to engage a plurality of input connectors of one or more redundant power supply receptacles, each input connector of the redundant power supply receptacle having contacts for hot, neutral, and ground; the redundant power supply receptacle further comprising a switch to select one or more of the input connectors of the redundant power supply receptacle for receiving power; and selecting for use, by the switch, the power from one of the plurality of independent power lines.

15. The method of claim 14 wherein receiving power from a single power source over a plurality of independent power lines further comprises contacting each power line independently to single contacts of the hot, neutral, and ground of a power source.

16. The method of claim 14 wherein selecting for use the power from one of the plurality of independent power lines further comprises selecting power for use to power a computer.

17. An apparatus for redundant power delivery, the method comprising:

means for receiving power from a single power source over power cable, the power cable comprising a first plug including contacts for hot, neutral, and ground and a plurality of power lines, each power line electrically connected independently to the hot, neutral, and ground contacts of the first plug at a first end and each power line having a second plug at a second end providing contacts for hot, neutral, and ground; each second plug of each power line is coupled to an input connector of a selectable redundant power adapter, each input connector of the selectable redundant power adapter comprising a hot, neutral, and ground contact and adapted to engage each second plug of each power line; the redundant power adapter further comprising a plurality of output connectors, each output connector providing a hot, neutral, and ground contacts and adapted to engage a plurality of input connectors of one or more redundant power supply receptacles, each input connector of the redundant power supply receptacle having contacts for hot, neutral, and ground; the redundant power supply receptacle further comprising a switch to select one or more of the input connectors of the redundant power supply receptacle for receiving power; and means for selecting for use, by the switch, the power from one of the plurality of independent power lines.

18. The apparatus of claim 17 wherein means for receiving power from a single power source over a plurality of independent power lines further comprises means for contacting each power line independently to single contacts of the hot, neutral, and ground of a power source.

19. The apparatus of claim 17 wherein means for selecting for use the power from one of the plurality of independent power lines further comprises means for selecting power for use to power a computer.

* * * * *